UNITED STATES PATENT OFFICE.

HANS HINRICH BAUMGARN, OF DAVENPORT, IOWA.

PROCESS OF COATING METAL.

No. 847,881.      Specification of Letters Patent.      Patented March 19, 1907.

Application filed November 28, 1906. Serial No. 345,545.

*To all whom it may concern:*

Be it known that I, HANS HINRICH BAUMGARN, a citizen of the United States, residing at Davenport, in the county of Scott and State of Iowa, have invented certain new and useful Improvements in Processes for Coating Metal, of which the following is a specification, reference being had therein to the accompanying drawing.

This invention relates to a process for coating metal surfaces—as, for instance, the interior of boilers or tanks—with brass, whereby scaling, rusting, and corroding of the metal is prevented. Any boiler that does not scale saves fuel. Therefore I claim this a valuable invention.

The metal to be brass-coated, such as iron or steel, must be first heated, and the heating of the metal can be either done in a furnace or at the time of manufacture, as it is then at a suitable temperature. While the metal is hot I apply a thin coating of pulverized glass to the heated metal and then give the glass sufficient time to melt and coat not only the exposed part of the metal, but also the cracks and crevices thoroughly before the brass is applied. It is of great importance to apply the coating of glass prior to applying the brass, because I have found from practical experience that by applying the glass first a perfect coated article is produced. After the powdered glass has been applied to the heated metal I then subject the glass-coated metal to a preparation of preferably melted brass, although I may sprinkle particles of brass upon the glass-coated metal. However, I have found from practical experience that it is best to subject the glass-coated metal to melted brass—that is to say, the metal, after the glass has been applied, should be thoroughly dipped in the brass in such a way as to make the brass stick on the metal. To obtain an even and smooth surface on the metal thus treated, it is preferable to subject the same to pressure by running it through rollers after the brass has been applied thereto.

The above process of treating metal—as, for instance, steel or iron—relates more particularly to large quantities of material. In smaller quantities or pieces the same process may be used by placing the smaller pieces in a hot fire to heat and then after removing the metal from the fire placing the pulverized glass on the hot surface and permitting the glass to melt and fill the cracks and crevices thoroughly. Subsequently the brass is placed on this glass-coated surface in any shape or form to get any suitable thickness of brass on the steel or iron.

Iron and steel have crevices and cracks which should be perfectly covered by the glass to produce a perfectly brass-coated finished article, and this is only accomplished by glass-coating the heated metal prior to the application of the brass, so that the glass will have time to melt and not only cover the exposed parts of the surface to be coated, but also the entire surfaces of the cracks and crevices. When the brass (in a liquid state) is applied to the glass-coated surface, the same will commingle perfectly with the glass not only upon the exposed surface of the metal to be coated, but also in the crevices and cracks, thereby producing a perfectly brass-coated article, the brass coating of which article has no imperfections or defects.

What I claim is—

The process of brass-coating metal, comprising heating the metal to be coated, then applying a thin coating or covering of dry, pulverized glass to the entire surface of the metal to be coated, then permitting said pulverized glass to melt upon the metal and enter all of the cracks and crevices and entirely glass-coat said cracks and crevices and outer surface, then applying brass to the glass-coated surface of the metal while the same is heated, and then permitting the metal to cool.

In testimony whereof I hereunto affix my signature in presence of two witnesses.

HANS HINRICH BAUMGARN.

Witnesses:
T. L. WALES,
R. L. GUERNSEY.